Feb. 10, 1970  P. V. CHOATE  3,494,249
WEAPON SYSTEM INCLUDING A LAUNCHER OF THE ROCKET LAUNCHER
TYPE AND A PROJECTILE OF THE ROCKET TYPE
Filed May 1, 1968  6 Sheets-Sheet 1

INVENTOR
PAUL V. CHOATE
BY,
ATTORNEY

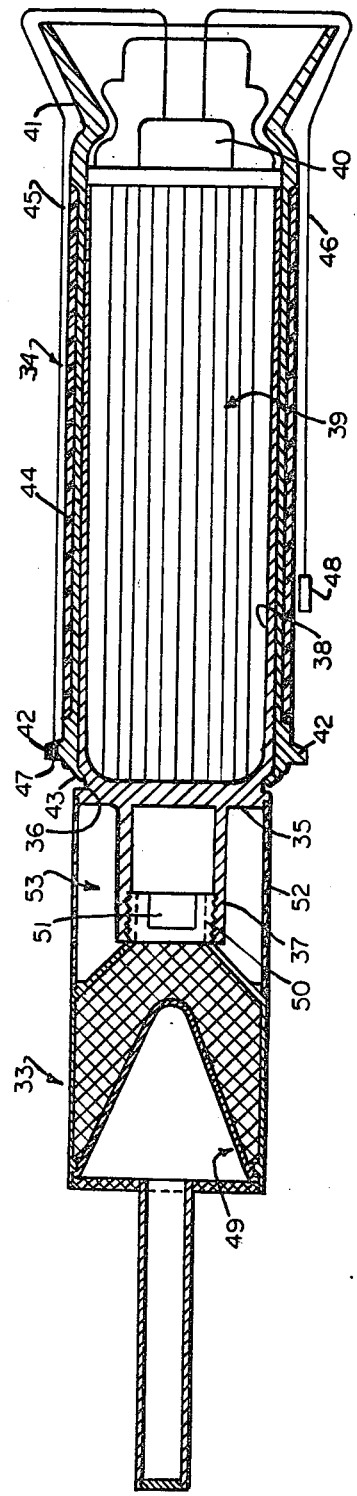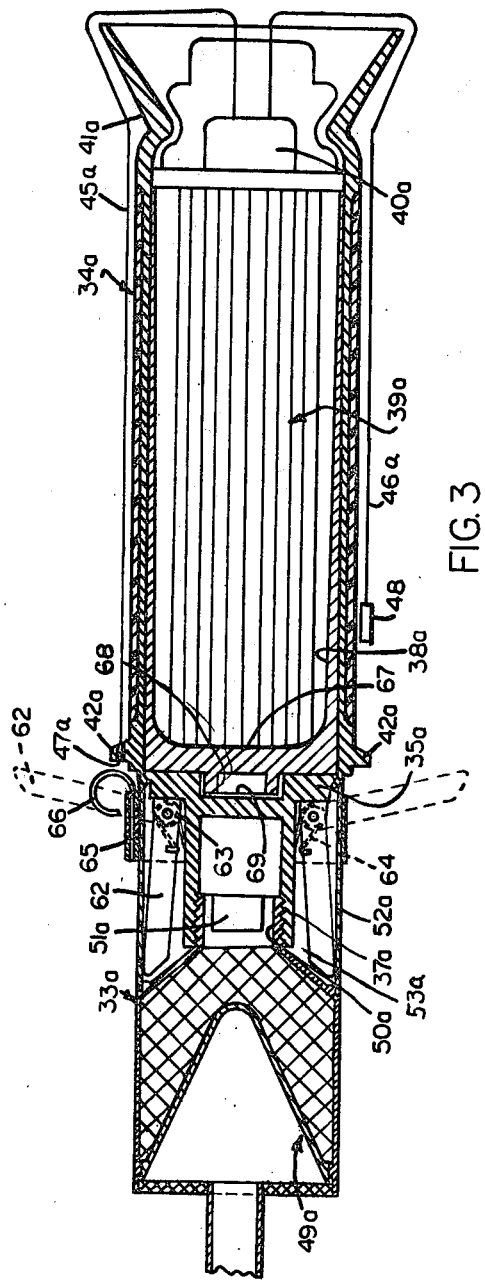

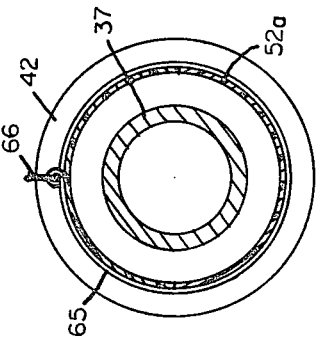
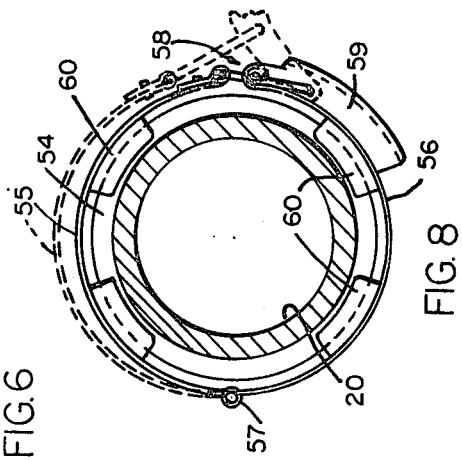
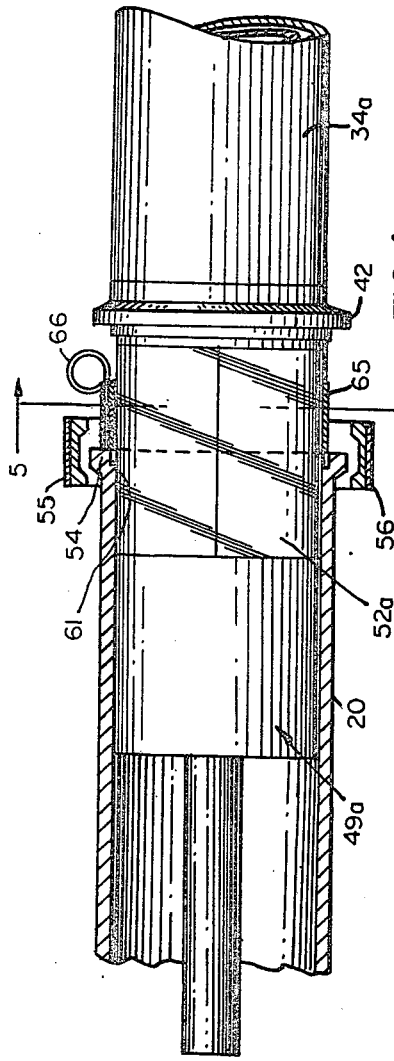
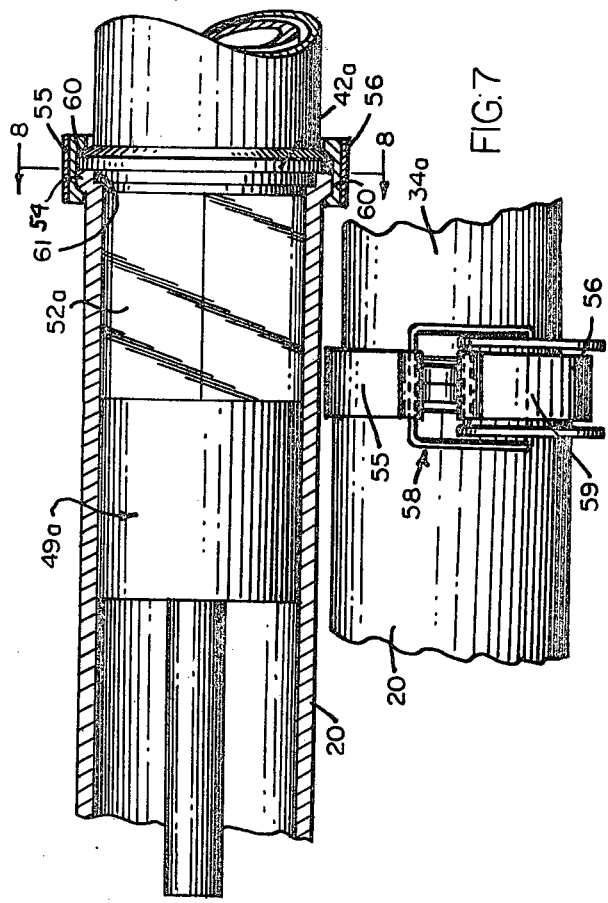
INVENTOR
PAUL V. CHOATE
BY,
Abbott Spear,
ATTORNEY

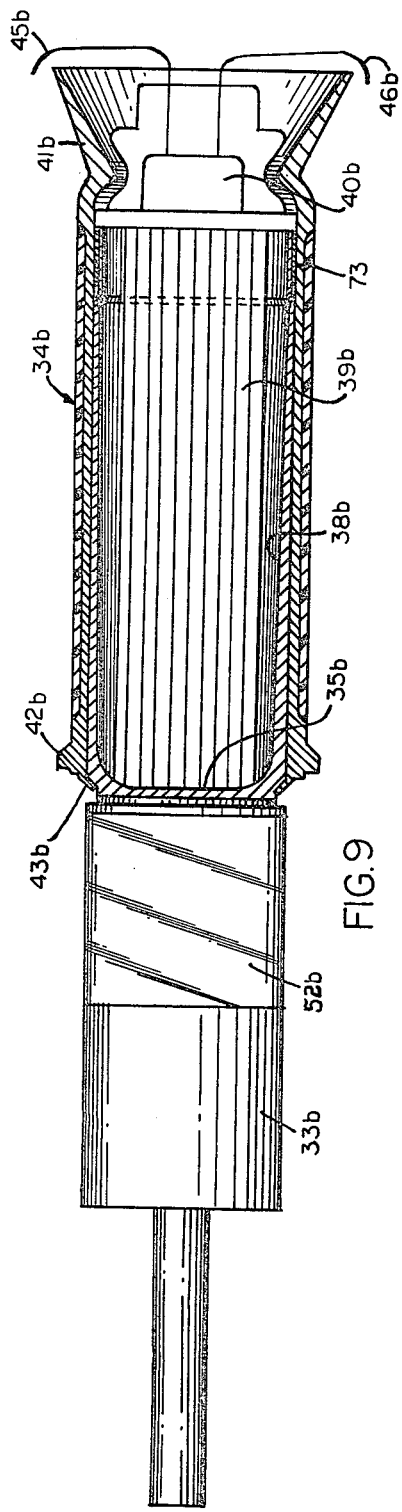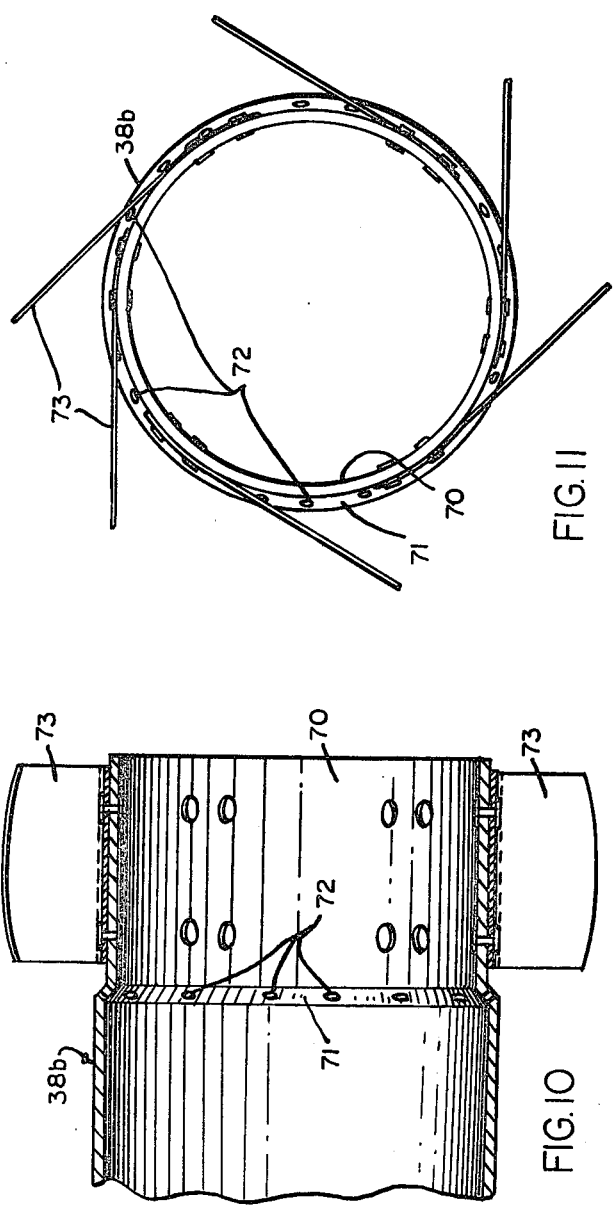

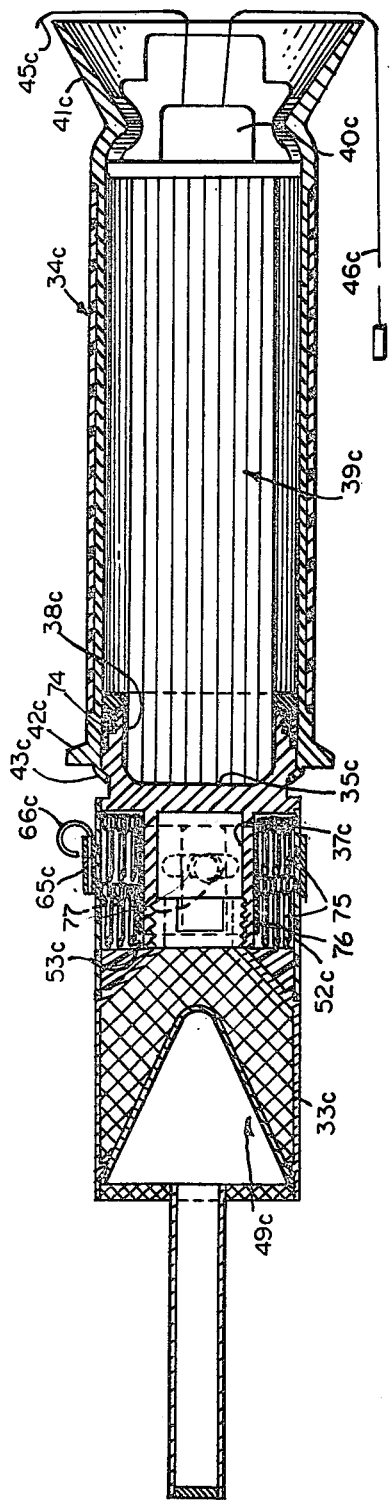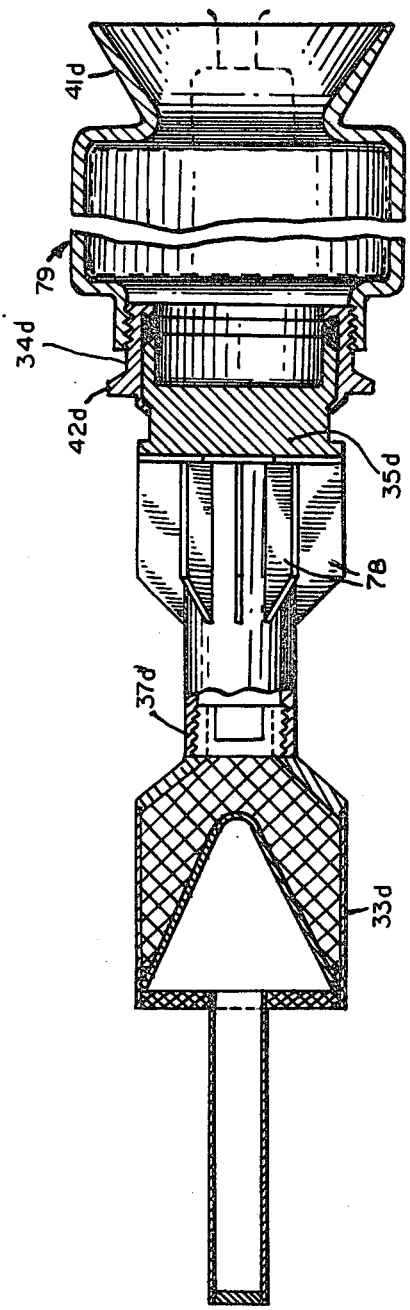

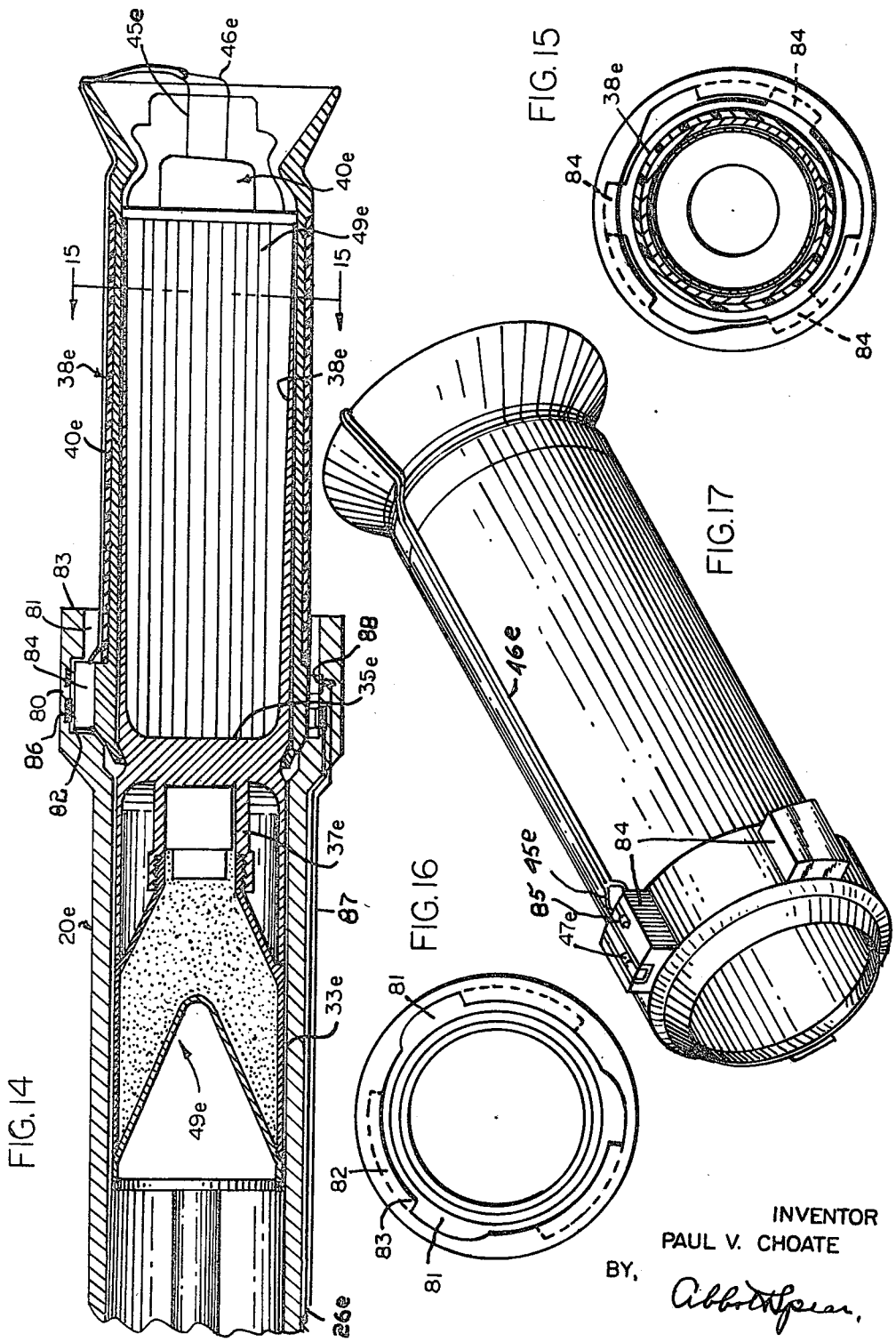

United States Patent Office 3,494,249
Patented Feb. 10, 1970

3,494,249
WEAPON SYSTEM INCLUDING A LAUNCHER OF THE ROCKET LAUNCHER TYPE AND A PROJECTILE OF THE ROCKET TYPE
Paul V. Choate, Milton, Mass., assignor to Norris Industries, Inc., Los Angeles, Calif., a corporation of California
Filed May 1, 1968, Ser. No. 725,714
Int. Cl. F41f 3/04
U.S. Cl. 89—1.8                                    14 Claims

ABSTRACT OF THE DISCLOSURE

Weapon system including a rocket launcher of the rocket launcher type and rounds therefor, each round including a fore part and a rear part, the rear part having a detachable connection with the breech end of the launcher and the two parts of the round having a connection which releases when the round is fired, the fore part being a rocket-like projectile and the rear part functioning as a discardable extension of the launcher.

---

Figure 1:
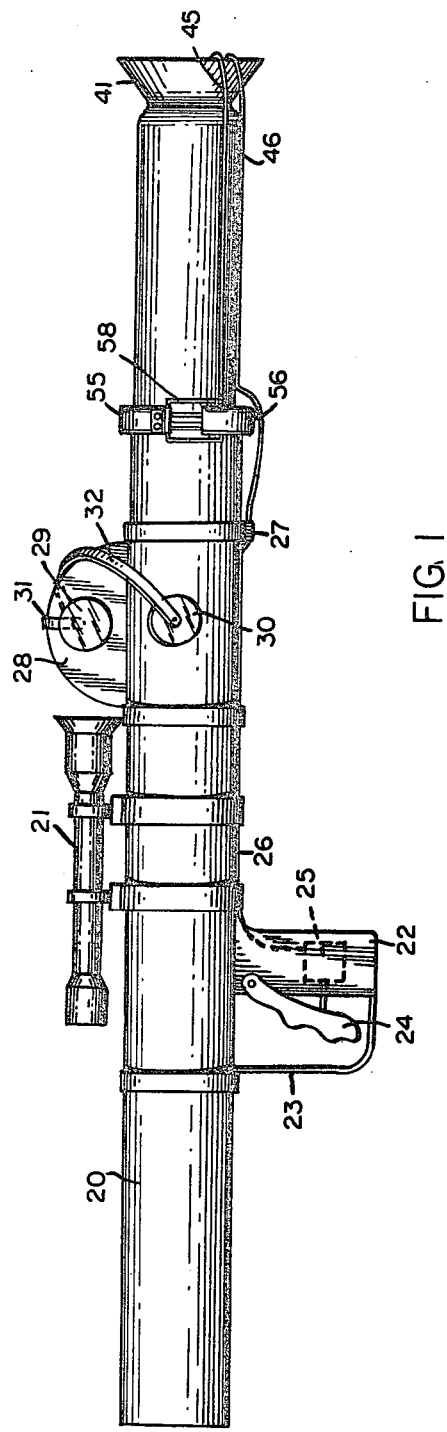

The present invention relates to a missile system consisting of launcher and round combinations and to the launchers and rounds by themselves for use in such systems.

Rockets and their launchers provide a wide range of weapon systems. Their many advantages combine to provide weapons that, while effective against substantial armament, are of such dimensions and weights as to be well adapted to be carried and used by infantrymen.

Proposals to improve the effectiveness of rockets by increasing their caliber, their velocity, or both present substantial difficulties where portability is a prime requirement because not only must the launcher be capable of withstanding the heavy initial load attendant the firing of the more powerful launch motor but also their length must be increased as round caliber, velocity, or both is increased. Accordingly, the length of a launcher that can be readily carried by an infantryman has been the most important factor limiting the caliber of rockets to be used when they and the launchers are to be carried by individuals.

The principal objective of the present invention is to provide a rocket-rocket launcher type of system that overcomes the caliber-to-launcher length limitations in the path of increases in round calibers in portable systems. In accordance with the invention, this objective is attained by providing a tubular launcher and round of ammunition combination with the round including a fore part or projectile and a rear part or container. The rear part of the round and the breech end of the launcher include detachably attached portions and the two round parts have a connection that is releasable when the round is fired. The launch motor is within the rear part of the round and when the round is fired, the rear part functions as a discardable launcher extension and the fore part functions as a projectile of the rocket type.

Another objective of the invention is the provision of a round construction in which the fore part includes a bulkhead to which the front end of the rear part is releasably connected and which includes a cylindrical part extending into the rear part. The cylindrical part may contain the propellant of the launch motor and function as an obturator or it may be short and be provided with an obturator responsive to the gas pressure resulting from the ignition of the propellant housed in the rear part of the round.

Another objective of the invention is the provision of the fore part with fins and these may be of self-erecting types and they may be located either forwardly or rearwardly of the bulkhead.

Another objective of the invention is to provide the fore part of the round with an axial connection between the bulkhead and the warhead providing a cylindrical space and with a longitudinally divided enclosure for that space. The enclosure is held in place by a releasable band dimensioned and located to enable the round to be inserted into the launcher until the enclosure is also held in place thereby and the band then removed. The cylindrical space may house self-erecting fins or a plurality of smaller missiles.

Yet another objective of the invention is the provision of a launcher having means at its rear or breech end enabling the front end of the rear part of the round to be quickly and securely attached and subsequently released thereby to enable substantially the whole length of the rear part to function as a disposable launcher extension.

In the accompanying drawings, there are shown illustrative embodiments of the invention from which these and other of its objectives, novel features, and advantages will be apparent.

In the drawings:
FIGURE 1 is a side elevation of a loaded rocket launcher in accordance with the invention,
FIGURE 2 is a longitudinal section through a round in accordance with the invention,
FIGURE 3 is a like view of another round in accordance with the invention,
FIGURE 4 is a fragmentary and partly sectioned view of the launcher illustrating its loading with the round of FIGURE 3,
FIGURE 5 is a section taken approximately along the indicated lines 5—5 of FIGURE 4,
FIGURE 6 is a view similar to FIGURE 4 but with the round attached to the launcher,
FIGURE 7 is a fragmentary side elevation of the round and launcher showing the toggle-actuated attaching means,
FIGURE 8 is a section taken approximately along the indicated lines 8—8 of FIGURE 6,
FIGURE 9 is a partly sectioned side view of a round in accordance with another embodiment of the invention,
FIGURE 10 is a fragmentary longitudinal section of the rear end of the rocket portion of the round shown in FIGURE 9,
FIGURE 11 is a rear end view thereof,
FIGURE 12 is a longitudinal section of yet another round in accordance with the invention,
FIGURE 13 is a like view of a round in accordance with another embodiment of the invention,
FIGURE 14 is a fragmentary and longitudinally sectioned view illustrating another launcher and rocket combination in accordance with the invention,
FIGURE 15 is a section taken approximately along the indicated lines 15—15 of FIGURE 14.
FIGURE 16 is a perspective view of the rear part of the round shown in FIGURE 14, and
FIGURE 17 is a breech end view of the launcher shown in FIGURE 14.

In the embodiment of the invention illustrated by FIGURE 1, the rocket launcher 20 is shown as consisting of a tubular portion having a telescopic sight 21 mounted thereon and as a depending hand grip 22 provided with a guard 23 for the trigger 24. While the ignition system may be of other types, it consists of a trigger-actuated magneto 25 housed within the hand grip 22 and having a lead 26 including a socket 27 adjacent the breech end of the launcher 20.

The launcher 20 is shown as provided with a mount 28 provided with right and left ear protectors 29 and 30, respectively, and located to the right of the sight axis. The ear protector 29 is supported by a resiliently yieldable clip 31 and the left ear protector 30 is mounted at the free end of a head-straddling, resiliently yieldable band or support 32. The mount 28 is so located that, in sighting the launcher 20, the user finds it far easier and more comfortable to place his right ear against the protector 29 and to place the ear protector 30 against his left ear. Because of the resilient mounting of the ear protector, the user is able to shift his head in any direction to a sufficient extent to ensure that he is in a correct sighting position. With this arrangement, the rounds may be designed without regard to the effect on the hearing of the user that might result were his ears not suitably protected.

The launcher 20 is for a round such as that shown in FIGURE 2 as having fore and rear parts generally indicated at 33 and 34, respectively. The rear part 34 is detachably attached to the breech end of the launcher 20 and functions as a disposable, rearward extension thereof. The portions 33 and 34 are releasably interconnected with the fore portion 33 functioning as a missile of the rocket type when the round is fired.

In more detail, the fore or projectile portion 33 of the round includes a bulkhead 35 provided with an annular groove 36, an axially located and forwardly extending tubular mount 37 and rearwardly disposed and rearwardly tapering sleeve 38 extending slidably within the rear portion 34 and housing the generally indicated propellant charge 39 with its igniter 40 exposed in the nozzle 41 of the rear part 34. The rear part 34 has an annular, outwardly disposed flange 42 adjacent its forward end 43 which is shown as crimped in the groove 36. The rear portion 34 is shown as having a fibreglass coat 44. The igniter 40 has leads 45 and 46 with the lead 45 including a contact 47 carried by but insulated from the flange 42 and exposed to provide a ground when the rear part 33 is attached to the launcher 20. The lead 46 has a contact 48 then to be entered into the socket 27.

The mount 37 serves as a support for the generally indicated warhead 49 having an end portion 50 threaded into the mount 37 which also functions to house the warhead fuze 51. A fairing 52 supported by the warhead 49 and the bulkhead 35, encloses the cylindrical space 53 between them.

In the embodiment of the launcher illustrated by FIGURES 1, 4, and 6-8, the breech end of the launcher 20 is provided with an outwardly disposed flange 54 against which the flange 42 of the rear part 34 of the round seats when a round is in its loaded position within the launcher 20. The launcher 20 has spring steel bands 55 and 56 with one end of each pivotally connected as at 57 to the launcher. The other ends of the bands are interconnected by a toggle 58 having an actuating arm 59 by which the bands 55 and 56 may be drawn into an operative, round-clamping position or released to enable the rear part 34 of a fired round to be detached and discarded. Each of the bands 55 and 56 is provided with arcuate holders 60 of U-shaped cross section shaped and dimensioned to receive and clamp together the flanges 54 and 42 when the bands 55 and 56 are drawn into their operative position illustrated by FIGURE 6. As may best be seen in FIGURE 6, the proximate faces of the interlocked flanges are flat while the remote faces taper inwardly away from each other. As may also be seen in FIGURE 6, the breech end of the launcher 20 has an annular recess or throat 61 disposed and dimensioned to accommodate the end 43 of the rear part 34 of the round when it becomes uncrimped to permit the separation of the round parts when the propellant charge is fired.

When a round is fired, its front portion 33 is launched as a rocket with the rear part 34 functioning as a launcher extension and with the sleeve 38 functioning both as a stabilizer, since it provides desirable rocket length characteristics, and as an obturator since its taper permits expansion in response to the gas pressures of the ignited propellant charge.

Round stability may also be attained by means of fins. The embodiment of the round illustrated by FIGURES 3-7, shows a round generally similar to that shown in FIGURE 2 and the same reference numerals are employed to illustrate corresponding parts but these are distinguished by the suffix addition A.

The round shown in FIGURES 3-7 has fins 62 pivotally connected as at 63 to the front face of the bulkhead 35A and extend forwardly in the cylindrical space 53A and are held against the erecting action of springs 64 by a longitudinally divided enclosure or fairing 52A which is held together by a band 65 whose ends are formed to provide a piano-hinge joint held together by a pull-pin 66.

As is illustrated by FIGURE 4, the round of FIGURES 3-7 is entered into the breech end of the launcher 20 until the split fairing 52A has been positioned to be so held thereby that the pull-pin 66 may be withdrawn enabling the band 65 to fall free and the fore part of the round then to be fully entered into the breech end of the launcher 20. When the round is fired, the front portion 33A is launched as a rocket with the split fairing 52A falling free and the fins 62 becoming erected by the springs 64.

It will be noted from FIGURE 3 that instead of the bulkhead 35A being integral with the sleeve 38A, the sleeve 38A also includes a bulkhead 67 at its front end provided with an axial projection 68 entrant of a socket 69 in the rear face of the bulkhead 35A. With this construction, the sleeve 38A retains its obturator function but falls free from the rocket or fore part 33A in flight.

The round illustrated by FIGURES 9-11 is generally similar to the rounds that have previously been disclosed and the same reference numerals are employed to designate corresponding parts and these are distinguished by the suffix addition "B." In this embodiment of the invention, the rear part 34B is the same as the rear part 34 and the fore part 33B is the same as the fore part 33 with the exception of the sleeve 38B.

The sleeve 38B has an end portion 70 which is of reduced diameter and an intermediate shoulder 71 provided with circumferentially spaced ports 72. Fins 73 of resiliently yieldable stock are anchored to the end portion 70. Before the round is fired, the fins 73 are held in an overlapping relationship against the end portion 70 by the rear part 34B of the round as shown in FIGURE 9 but when the round is fired and the fore part 33B is launched as a rocket from the launcher 20, the fins 73 spring into their operative position illustrated by FIGURES 10 and 11.

The round shown in FIGURE 12 is also generally similar to those previously described and the same reference numerals are again employed to designate the corresponding parts and these are distinguished by the suffix addition C. In this embodiment of the invention, the rear part 34C is the same as the rear part 34 but instead of a long and tapering sleeve, the bulkhead 35C has a short annular flange 38C with an obturator 74 carried by it and deformable outwardly in response to gas pressure when the round is fired.

Another feature of the invention illustrated by FIGURE 12 is the use of the space 53C to house a substantial number of small anti-personnel missiles 75. These are backed by a resilient expansion member shown as a spring steel band 76 encircling the axial mount 37C with a sliding connection 77 between its ends permitting limited expansion. The missiles 75 are held against the spreading action of the member 76 until the round is secured to the breech of the launcher 20, by a split fairing 52C held in place by the ring 65C in the same manner as were the fins 62 in the round illustrated in FIGURES 3-8 and released by removing the pull-pin 66C. The split fairing 52C is then held in place by the launcher 20 while the loading of the launcher is completed. After the launch of the fore part 33C, the anti-personnel missiles 75 are free and spread in flight for effective coverage of an area with their concentration being largely a function of the range.

The round illustrated by FIGURE 13 has its corresponding parts illustrated by the same reference numerals but these are distinguished by the suffix addition D. In this embodiment of the invention, the fore part 33D has its projection 36D of increased length and supports fixed fins 78 forwardly of the bulkhead 35D. The rear part 34D is shown as a short sleeve to which is threaded a motor housing 79 of substantially increased diameter and including a nozzle 41D.

In the embodiment of the invention illustrated by FIGURES 14–17, the launcher is indicated at 20E and as, except for its breech end, it may be identical to the launcher 20, only its breech end will be detailed. The launcher 20E has a receiver 80 provided with a series of spaced lengthwise channels 81 opening into laterally extending cam pockets 82 defining retaining lugs 83. The round may be the same as the other rounds and, accordingly, the same reference numerals are employed to designate corresponding parts but these are distinguished by the suffix additions E. The rear part 34E differs in that it includes a series of locking cams 84 spaced and dimensioned to enter appropriate ones of the channels 86 and, when the round is turned relative to the launcher, to enter a cam pocket 82 in locking engagement with the lugs 83. One lug 84 is shown as having an insulated contact 47E which establishes a ground for the igniter lead 45E when the round is attached.

The rocket launchers may be of material that is a non-conductor of electricity and, accordingly, the launcher 20E may be assumed to be of fibreglass. The lead 46E, in that case, has a contact 85 in a lug 84. The magneto lead 26E is connected to a ring 86 exposed in the pockets 82 for engagement by the contact 47E and a second magneto lead 87 is connected to a ring 88 exposed in the pockets 82 and spaced axially from the ring 86 and engageable by the contact 85 when the round is secured to the launcher 20E.

From the foregoing, it will be appreciated that the invention provides a weapons system having a wide range of desirable features and adapted to meet a wide range of requirements both in production and in use. One important feature is that the launcher may be relatively light in weight and still be capable of reuse since the rear parts of the rounds, which are discardable extensions of the launchers, are capable of withstanding not only the initial heavy load attendant round ignition but also the maximum load during the burning of the launch motor propellant.

I claim:

1. In combination, a tubular launcher section having a breech and a round of ammunition, said round including a projectile and a rearward container of cylindrical section and which has a rearward, axial nozzle, the front end of said container and said breech including detachably attached portions with the major portion of said container extending rearwardly of the breech, a propellant charge within the container, and the projectile and the container including a connection that is released by forces developed when the propellant charge is fired, the wall of the container being of sufficient strength to withstand pressures attendant the combustion of the propellant charge whereby the container functions as a discardable launcher section providing the overall launcher length essential for the effective burning of the propellant charge within the launcher.

2. The combination of claim 1 in which the projectile has an obturator extending into the cylindrical container.

3. The combination of claim 1 in which the detachably attached portions include outwardly disposed abutting flanges, one at the breech end of the launcher and the other adjacent the front end of the container, and straps connected at one end to the launcher, toggle means interconnecting the other ends of the straps, the straps encircling the abutted flanges and including channel portions receiving abutted flanges within them.

4. The combination of claim 1 in which the projectile has forward and rearward shoulders defining an annular chamber, a longitudinally divided fairing for the chamber seated on the shoulders, a strap encircling the enclosure and holding it against the shoulders and including a releasable connection, the strap being sufficiently narrow and being so located that the front part of the projectile can be entered into the breech to an extent such that the enclosing strap is also held closed by the launcher but with the connection thereof exposed.

5. A round of ammunition for use with a launcher having attaching means at its breech, said round including a projectile dimensioned for entry into the breech end of the launcher, and a rearward container of cylindrical section and having a rearward axial nozzle, a propellant charge within the container, the projectile and the container including a connection that is releasable by forces developed when the propellant charge is fired, and the container includes means adjacent its forward end for cooperative engagement with the attaching means of the launcher and so located that the major portion of the container extends rearwardly of the breech when the round is attached to the breech and functions as a discardable launcher extension, the wall of the container being of sufficient strength to withstand the pressures attendant the burning of said charge.

6. The round of claim 5 in which the projectile has an obturator which extends into the cylindrical container.

7. The round of claim 6 in which the obturator extends substantially the full length of the container with the propellant charge within it and constitutes a stabilizer in flight.

8. The round of claim 5 in which the projectile includes a bulkhead, a forwardly located warhead, an axial stem connecting said bulkhead and said warhead in spaced relationship, self-erecting fin means attached to the fore part in the space between the warhead and the bulkhead, a longitudinally divided fairing supported by the warhead and the bulkhead encloses the fin means, and a band encircles and holds the fairing together and includes a detachable connection.

9. The round of ammunition of claim 8 in which the fin means comprises a plurality of forwardly disposed fins pivotally connected to the front of the bulkhead and bearing against the bulkhead in their erected position, and springs yieldably urge the fins into their erected position against the holding action of the fairing when constrained by the band or by the launcher when the fore part has been entered therein.

10. The round of ammunition of claim 5 in which the fore part includes a bulkhead, a forwardly located warhead, an axial stem connecting the warhead and the bulkhead in axially spaced relationship, a plurality of missiles in the space between the warhead and the bulkhead, a longitudinally divided fairing supported by the warhead and the bulkhead encloses the space and the missiles therein, and a band encircles and holds together the fairing, the band including a releasable connection.

11. The round of ammunition of claim 10 and a resilient expansible member encircling the stem and underlying the missiles and held inoperative by the fairing when held together by the band or by the launcher when the fore part is entered therein.

12. The round of ammunition of claim 11 in which the member is a resilient band including end portions slidably joined to permit limited expansion.

13. A tubular launcher for use with a round of ammunition having a projectile, and a rearward container of cylindrical section, the front end of said container having attaching means and the container housing the propellant charge, a connection between the projectile and the container that is releasable when the round is fired, the launcher including attaching means adjacent its breech that are cooperative with the attaching means of the round of ammunition in detachably securing the container to the launcher whereby the container functions as a discardable launcher extension, and a sight and a mount carried by the launcher, a protector against which one ear of the user is to be placed, a resiliently yieldable connection between the protector and the mount, a protector for the other ear of the user, and a resiliently yieldable connector in the form of a U-shaped, head-straddling band connecting the second named protector to the mount, the mount being so located that the ear protectors are in the zone occupied by the head of the user when in sighting position, the connections enabling the user's head to be shifted in any direction to a limited extent relative to the mount with his ears protected by the protectors.

14. A tubular launcher for use with a round of ammunition having a projectile and a rearward container of cylindrical section, the front end of said container having attaching means and the container housing the propellant charge, a connection between the projectile and the container that is releasable when the round is fired, the launcher including attaching means adjacent its breech that are cooperative with the attaching means of the round of ammunition in detachably securing the container to the launcher whereby the container functions as a discardable launcher extension, said attaching means of the launcher including an annular flange, straps secured at one end to the launcher, and a toggle connection between the other ends of the straps, the straps overlying the flange and having inwardly disposed channels of a width greater than the flange.

References Cited

UNITED STATES PATENTS

| | | | |
|---|---|---|---|
| 2,421,752 | 6/1947 | Jones | 102—38 |
| 2,465,401 | 3/1949 | Skinner | 244—3.28 |
| 2,791,961 | 5/1957 | Musser | 102—38 |
| 2,874,614 | 2/1959 | Musser | 89—1.7 |
| 2,961,928 | 11/1960 | Rosenthal | 89—1.816 |
| 2,966,827 | 1/1961 | Harvey | 89—1.816 |
| 3,326,128 | 6/1967 | Choate | 89—1.818 X |

SAMUEL W. ENGLE, Primary Examiner

U.S. Cl. X.R.

89—1.816; 102—38, 49.3, 56, 93; 244—3.28, 3.29